(12) United States Patent
Snyder (10) Patent No.: US 7,995,725 B1
(45) Date of Patent: Aug. 9, 2011

(54) COMPILATION, ANALYSIS, AND GRAPHIC REPRESENTATION OF CALL DATA

(75) Inventor: Richard K. Snyder, Macedonia, IA (US)

(73) Assignee: West Corporation, Omaha, NE (US)

( * ) Notice: Subject to any disclaimer, the term of this patent is extended or adjusted under 35 U.S.C. 154(b) by 1345 days.

(21) Appl. No.: 11/382,797

(22) Filed: May 11, 2006

(51) Int. Cl.
    *H04M 15/00* (2006.01)
(52) U.S. Cl. .............. 379/133; 379/112.01; 379/112.03; 379/112.04; 379/112.06; 379/136
(58) Field of Classification Search .................. 379/111, 379/112.01, 112.03, 112.04, 112.06, 112.07, 379/133, 134, 136, 137, 139, 141
    See application file for complete search history.

(56) References Cited

U.S. PATENT DOCUMENTS

| | | | | |
|---|---|---|---|---|
| 4,456,788 A * | 6/1984 | Kline et al. | ............ | 379/137 |
| 5,600,632 A * | 2/1997 | Schulman | ............ | 370/252 |
| 5,799,073 A * | 8/1998 | Fleischer et al. | ............ | 379/112.01 |
| 5,923,742 A * | 7/1999 | Kodialam et al. | ............ | 379/133 |
| 5,940,494 A | 8/1999 | Rafacz et al. | | |
| 6,359,976 B1 * | 3/2002 | Kalyanpur et al. | ............ | 379/134 |
| 6,392,666 B1 | 5/2002 | Hong et al. | | |
| 6,466,663 B1 | 10/2002 | Ravenscroft et al. | | |
| 6,529,901 B1 * | 3/2003 | Chaudhuri et al. | ............ | 1/1 |
| 6,707,904 B1 | 3/2004 | Judkins et al. | | |
| 6,711,253 B1 | 3/2004 | Prabhaker | | |
| 6,744,866 B1 * | 6/2004 | Nolting et al. | ............ | 379/133 |
| 6,973,171 B2 * | 12/2005 | Ljubicich et al. | ............ | 379/112.06 |
| 2002/0067821 A1 | 6/2002 | Benson et al. | | |
| 2003/0002653 A1 | 1/2003 | Uckun | | |
| 2003/0086557 A1 | 5/2003 | Shambaugh et al. | | |
| 2003/0097438 A1 * | 5/2003 | Bearden et al. | ............ | 709/224 |
| 2003/0135477 A1 | 7/2003 | Elsey et al. | | |
| 2003/0149586 A1 | 8/2003 | Chen et al. | | |
| 2004/0057416 A1 | 3/2004 | McCormack | | |

* cited by examiner

*Primary Examiner* — Binh K Tieu (57) ABSTRACT

A system, method, and computer readable medium that comprises, receiving an incoming communication, compiling statistics related to the incoming communication and analyzing the compiled statistics.

17 Claims, 10 Drawing Sheets

COMPILATION, ANALYSIS, AND GRAPHIC REPRESENTATION OF CALL DATA

BACKGROUND OF THE INVENTION

The present invention is generally related to data analysis and, more particularly, to a system, method, and computer readable medium for the compilation, analysis, and graphic representation of call data. Further, the present invention describes the gathering of incoming communications such as telephony into a database, and managing the display of the data back to a user via query commands and graphical user interfaces that depict the data in reference to a geographical representation of an area, region, city, county, state, or country.

Previously, the ability to properly receive, analyze, and map geographical related data were difficult and incomplete. For example, fully understanding the originating location of the data and a reason why the data was being sent was difficult to ascertain. Further, determining the possibility that a situation may arise (such as a problem that might occur) based on the data was not possible.

Therefore, what is needed is a solution that overcomes the aforementioned limitations by extracting a 6 digit North American Numbering Plan (NANP) consisting of a 3-digit Numbering Plan Area (NPA), area code and 3 digit NXX number which identifies the central office exchange allocated within the NPA. In the NPA-NXX number N is any digit from 2-9, and X varies from 0-9. NPA-NXX parameter associated with a telephone number from which the communication, a billing system, an Interactive Voice Response (IVR) or a Voice Response Unit (VRU), storing the parameter in a database, and managing the displaying of the information back to the user via structured query languages and graphical user interfaces.

SUMMARY OF THE INVENTION

The present invention describes methods by which call centers can receive, compile, and analyze data relating to inbound communications from callers, display results of such analysis to users, and present conclusions drawn from such data. The inbound communications can include many different interactions.

The nature of the inbound communications from callers can take forms such as Direct Response (DR) inbound calls from consumers responding to media buys conducted by merchants. The raw data resulting from such DR calls can be organized by chosen parameters, such as a specific client, specific product/service offered by the client, time of media buy, type of media buy, etc.

Another form of inbound communications can include transactions that are at least partially interactive or automated, wherein callers dial a given telephone number and are connected to an Interactive Voice Response (IVR) unit or platform, or to a Voice Response Unit (VRU), with which the callers interact with an application running on the IVR/VRU via a pre-defined script. Examples of such IVR/VRU applications might include those that support prepaid calling card functions. Other examples might include telephone numbers by which utility customers report outages, service disruptions, or the like in industries such as electrical power, gas, telephone, ISP, CATV, or the like.

Whatever the nature of the inbound communication, the present invention includes extracting an NPA-NXX parameter associated with the telephone number from which that communication originated. The NPA-NXX parameter represents the first six digits of a North American telephone number, typically digits identifying the area code and exchange associated with a given ten-digit telephone number. Known services such as the Automatic Number Identification (ANI) service can provide the number from which the communication originated. The invention then converts the NPA-NXX into a corresponding geographical equivalent, such as a latitude-longitude (lat-long) representation of the area from which the communication originated. Essentially, this process collapses a geographic region mapped to a given NPA-NXX into an equivalent centroid for modeling and analysis purposes. In other embodiments, other parameters can be extracted such as a Dialed Number Identification Service (DNIS), which is a telephone service that identifies for the receiver of a call the number that the caller dialed, as well as various parameters or information elements related to Signaling System 7 (SS7) and Integrated Services Digital Network (ISDN) protocols.

The parameters or data gathered in the above processes is organized or compiled into a database that stores data for numerous such communications to support analysis. This database can organize entries for search and retrieval by a variety of fields, such as lat-long from which calls originated, a direction and velocity of the caller via Global Positioning System (GPS) capability, purpose of the call, report outage, DR, interactive, etc., time/date of communications, client associated with call, etc.

Having been stored in the database as discussed above, the data related to these various communications can be retrieved upon demand and presented to a user, using, for example, known database query languages. Example queries might include identifying what types of calls came from what areas, and when. The system might also drill-down to specific geographic areas upon command (e.g., state, county, township, region, area, NPA-NXX, etc. or more than one of these geographic areas at the same time or in a certain order) further to help the user identify and analyze trends in call volumes or other activity related to the callers from specific regions.

The present invention can include supporting a graphical user interface, both for presentation of data and for accepting commands from the user to manipulate the data. The graphical user interface can support color-coding or otherwise graphically representing specific regions or areas depending on types and numbers of communications originating from such regions or areas. In essence, this function presents a type of graphic histogram that reflects what type and/or how many calls are or have originated from a given region. If the user has an interest in investigating a specific region in more detail, the user can click or otherwise select the graphic representation of that region, and the system can respond by presenting a more detailed graphic and/or a textual display of the data pertaining to the selected region or area. Such data can be historical, real-time, or near real-time data and can further include video or images related to the data.

The system can periodically execute predefined queries against the database, either to draw conclusions based on this data or to enable a human operator to draw such conclusions. For example, the system can be adapted to recognize when a given region Y originates X calls in a certain period of time, and highlight a graphic representation of that region when this threshold is reached. The threshold can be defined by referring to call history data or other historical data. In a more specific example pertaining to utilities-related calls, should this threshold be reached, the user may infer that area Y is suffering a utility outage or other disruption of service. Running the query allows the system to identify this scenario and flag or otherwise highlight it accordingly. Also, the size of the geographic region experiencing the spike in originated call volume may suggest possible causes of the outage or other disruption. Likewise, if the call data indicates that a given region is experiencing a spike or decrease in DR-type call volume, this event may suggest which media buys are most or least effective for a given client or detect anomalies.

In other embodiments, the system can be adapted to recognize when a given region Y originates X calls in a certain period of time, and highlight a graphic representation of that region when this threshold is reached or is about to be reached. The threshold can be defined by referring to call history data, other historical data, or data that is dynamically received. As such, the system or a human operator can ascertain that a problem is about to occur before the problem actually occurs. As such, various measures can be taken to avert the problem or to minimize the result of the problem.

In one embodiment of the present invention, a method for compilation, analysis and graphical representation of call data that comprises, receiving an incoming communication, compiling statistics related to the incoming communication and analyzing the compiled statistics. The method may also comprise determining originating geographical location of the communication, ascertaining a reason for the incoming communication, modeling incoming communication statistics, resolving compiled statistics by geographical region, identifying compiled statistical trends for a geographical region, storing compiled statistics, extracting incoming communications identification data, mapping compiled statistics geographically, managing display of compiled statistics, detecting issue probabilities from at least one of a spike incoming communication compiled statistics and a decline in incoming communication compiled statistics.

In another embodiment of the present invention, a system for compilation, analysis and graphical representation of call data, that comprises, a memory in which compiled statistics are stored, and a processor communicably coupled to the memory, wherein the processor receives an incoming communication, compiles statistics related to the incoming communication, analyzes the compiled statistics, and stores the compiled statistics in the memory. The processor may also convert telephone area code and exchange information into a geographical location, and map compiled statistics by geographical location.

In a further embodiment of the present invention, a computer readable medium comprising instructions that comprises, receiving an incoming communication, compiling statistics related to the incoming communication, and querying compiled statistics for specific information. The computer readable medium may comprise instructions for concluding inferred probabilities based upon the compiled statistics, storing the compiled statistics, organizing the stored statistics for search and retrieval, executing pre-defined queries of the stored statistics, representing graphically the compiled statistics by geographic location and highlighting represented geographic locations whose compiled statistics exceed a predetermined threshold.

DETAILED DESCRIPTION OF THE INVENTION

Figure 1:
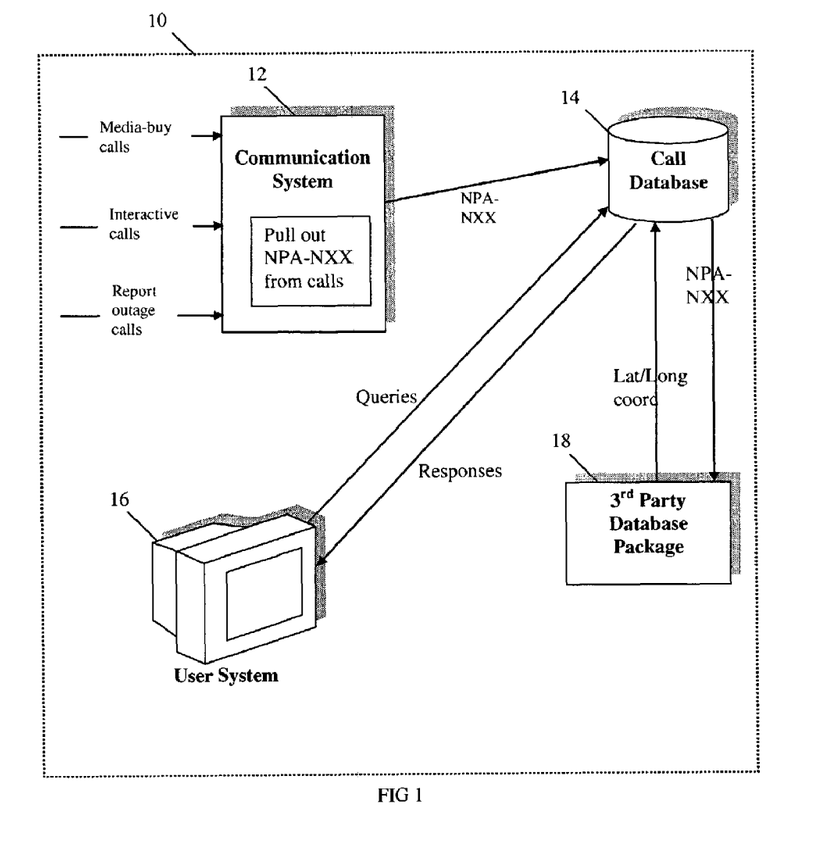
FIG. 1 depicts a network in accordance with a preferred embodiment of the present invention.

Referring now to FIG. 1, a network 10 of the present invention includes a communications system 12, a call database 14, a user system 16, and a third party database 18. These components 12-18 may be located in the same or in different locations. The communication system 12 can receive calls from a number of different sources. For example, such calls include media-buy calls where a client offers a product or service, interactive calls, where callers are connected to an Interactive Voice Response (IVR) unit or platform, or a Voice Response Unit (VRU), or incoming calls where customers report outages for various services.

The communication system 12 is adapted to retrieve the NPA-NXX (or other data as described above) of the incoming call, and the retrieved data is sent to the call database 14. The call database 14 sends the NPA-NXX data to the third party database 18 which is responsible for converting the NPA-NXX data to the equivalent latitude/longitude coordinates. The corresponding latitude/longitude coordinates are sent to the call database 14 which can collapse different regions mapped to NPA-NXX entries into a centroid. The data is compiled in the call database 14 according to user-specified parameters including: latitude/longitude coordinates from which the call originated, the purpose of the call, the time of the call, and other parameters as described above.

The call database 14 is able to receive and process queries from the user system 16. These queries include: the number of originated calls, the types of originated calls, areas or regions the calls originated from, when these calls originated. Given a geographic area (city, state, country, township or NPA-NXX) in a query, stored call data for the given area can also be returned.

The user system 16 supports a Graphical User Interface (GUI) allowing the system to accept commands and present data to the end user. Color-coded areas in the GUI will reflect the types and amount of incoming calls in a given area. The end user is able to click on the GUI and the user system 16 will drill-down or focus into the clicked area. The user system 16 further supports predefined queries against the call database 14 allowing the user system 16 to draw conclusions based on the data.

Figure 2:
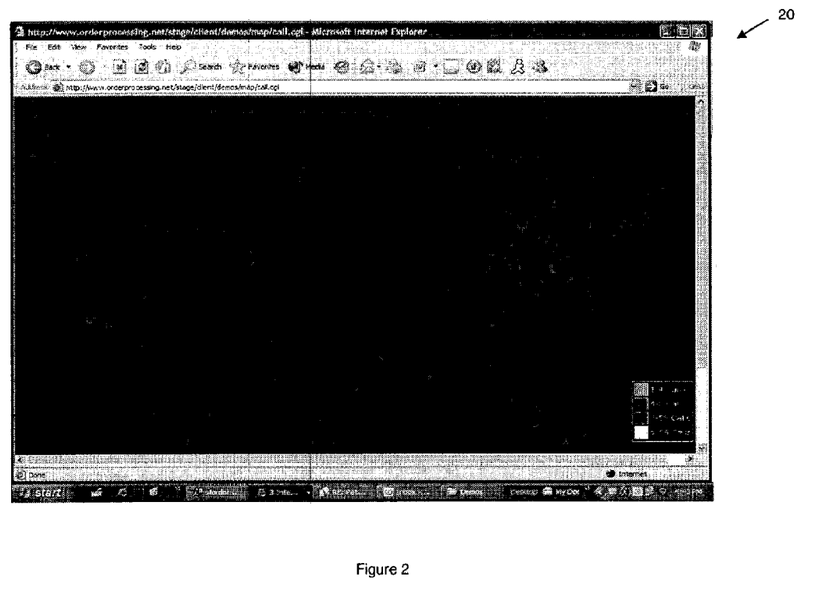
FIG. 2 depicts a first geographical representation of received and analyzed data in accordance with a preferred embodiment of the present invention.

Referring now to FIG. 2, a geographical map 20 of the present invention shows the GUI representation where different colors on the map may indicate various levels of incoming calls. Alarms can be triggered when user-defined thresholds are reached. In the current example, a legend on the GUI indicates that a bright green indicator on the map is equivalent to 1-4 calls, a dark green indicator is equivalent to 4-8 calls, a red indicator is equivalent to 8-55 calls, and a white indicator is equivalent to over 55 calls. As such, when a white indicator appears on the map, the threshold has been met or exceeded. If a red indicator appears on the map (as it does in California, for example), the threshold may be close to being met or exceeded. As such, the system or the operator may take measures prior to such a potential occurrence in order to ensure the threshold is not met or exceeded.

In one embodiment, a second indicator (visual, auditory, and the like) can be provided to the user to indicate an amount is rapidly moving toward the threshold. For example, when the red indicator, which is equivalent 8-55 calls, is at a midpoint (approximately 31 or 32) the second indicator can be provided. Also, when the red indicator is at a point close to the top end of the red indicator's range (approximately 53 or 54), a third indicator can be provided. As such, a number of colored indicators can be provisioned and a number of other indicators can be provisioned within each color indicator to indicate the proximity of the number of calls to the threshold of each color. Various actions can be taken by the system and the human operator based on the colored indicators and/or based on the other indicators within the colored indicators before the threshold is breached.

In another embodiment, if a threshold relating to the white (or highest valued or most important) indicator has been exceed, various actions can be taken by the system and the human operator based on the colored indicators and/or based on the other indicators within the colored indicators to address the problems. As the problem is being addressed, other indicators can be provided that denote a current number of incoming calls. If the number is dropping, the solutions to the problem are probably appropriate. If, however, the number is rising, the solutions to the problem are probably not appropriate.

Figure 3:
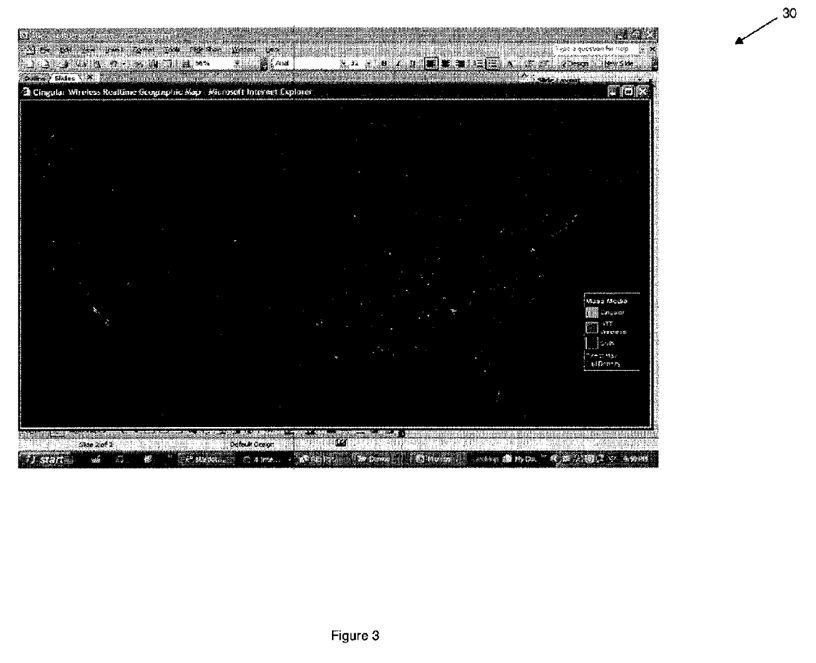
FIG. 3 depicts a second geographical representation of received and analyzed data in accordance with a preferred embodiment of the present invention.

Referring now to FIG. 3, a geographical map 30 showing results of a mass media campaign is depicted. Such results may be shown in real-time, near real-time, and/or after an event has occurred, and relate to data resulting from calls (such as direct response calls) that can be organized by chosen parameters, such as a specific client, specific product/service offered by the client, time of media buy, type of media buy, etc. Further, these results can relate to data resulting from calls utilizing a particular service provider or areas where more than one service provider could provide service. Still further, the results can relate to data resulting from a direct mail campaign directed toward the chosen parameters, the service providers, and the like. A response to the direct mail campaign or direct call campaign, or a plurality of responses to a mass mail campaign or mass call campaign, can be depicted. An amalgamation of such responses can also be shown.

For example, an entity may wish to gauge a response to an offer or a question posed via one or more of the campaigns described above. An understanding of a location of where those responses are originating, the actual responses, the time of the responses, and the like can be gleaned by passing over the corresponding section with a cursor, can be automatically presented based on pre-selected metrics or when a particular indicator or event is reached.

Further, a delta between a particular responder or group of responders can be identified. For example, an individual that originally responded in real-time or in near real-time to a questionnaire posed during a broadcast (such as a live broadcast) may also respond to that same questionnaire via email at some later time (for example one day later) and via the mail at an even later time (for example a week later). The entity soliciting the offer can then compare any changes in the responses from the same individual, over various times and over various mediums. Responses from the individual or group of individuals or the lack of responses from the individual or group of individuals can be studied to determine a best medium of delivery to that individual or group of individuals. Such responses can be utilized and accessed via and in conjunction with the software and GUI's of the present invention. In such a scenario, such information is presented with the information appearing on the GUI's. Further, the entity could pose the same questionnaire, a modified questionnaire, or a different questionnaire to the same individual or groups of individuals if the offer was successful to gauge any changes from the original answers, answers based on the modified questions (which may be presented based on the initial responses), and/or new answers.

Also, the entity could pose the same questionnaire or a variant of the questionnaire based on one or more of the following: if the responder answered one or more of the questionnaires over one or more of the mediums, the results of the answers received, the time in which the answers were provided, if an offer resulted in a sale, the price of the sale, the form of payment, the location of the purchaser or responder, results of a full or partial credit check or driving record of the purchaser or responder, the age and sex of the purchaser or responder, previous response or purchase history of the purchaser or responder.

The present invention can be utilized when an entity rolls-out or provides a new service or feature, or when the entity installs a new network or upgrades an existing network. The take-rate or acceptance of the new service or feature, especially if they are performed in real-time or near real-time, can be monitored and determined, and the upgrade or new installation can be monitored to determine if either a greater number of service calls or a fewer number of placed or completed calls are occurring to determine if problems exist based on the results depicted on the map. In other embodiments, in addition to calls, a number of emails, voice mails, instant messages, or other means of correspondence can be monitored.

Figure 4:
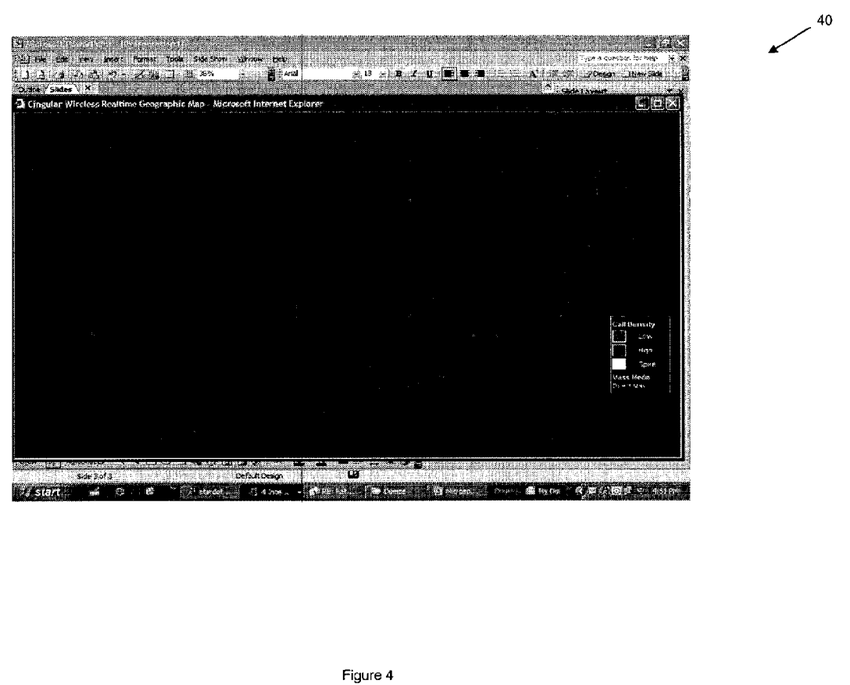
FIG. 4 depicts a third geographical representation of received and analyzed data in accordance with a preferred embodiment of the present invention.

Referring now to FIG. 4, a geographical map 40 depicts a call density of an event. For example, the call density of a direct mailing event for a particular wireless carrier is depicted. All of the actions and information described above can be performed and retrieved via this GUI 40.

Although an exemplary embodiment of the system, method, and computer readable medium of the present invention has been illustrated in the accompanied drawings and described in the foregoing detailed description, it will be understood that the invention is not limited to the embodiments disclosed, but is capable of numerous rearrangements, modifications, and substitutions without departing from the spirit or scope of the invention as set forth and defined by the following claims. For example, the capabilities of the system 10 of the present invention can be performed by one or more of the modules or components described herein or in a distributed architecture. For example, all or part of the functionality performed by the communications system 12, the call database 14, the user system 16, the third party database 18, and the like may be performed by one or more of these modules. Also, the functionality of the third party database may be provided by a database that is not considered a third party database but is rather a database belonging to an operator or manufacturer of the network 10, or of one or more of the modules or components of the network 10. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless source, a wired source and/or via plurality of protocols. Still further, the user system 16 may be a cellular phone, a computer or any type of device able to receive and send a message. Also, the messages sent or received by any of the modules may be sent or received directly and/or via one or more of the other modules or nodes.

Figure 5:
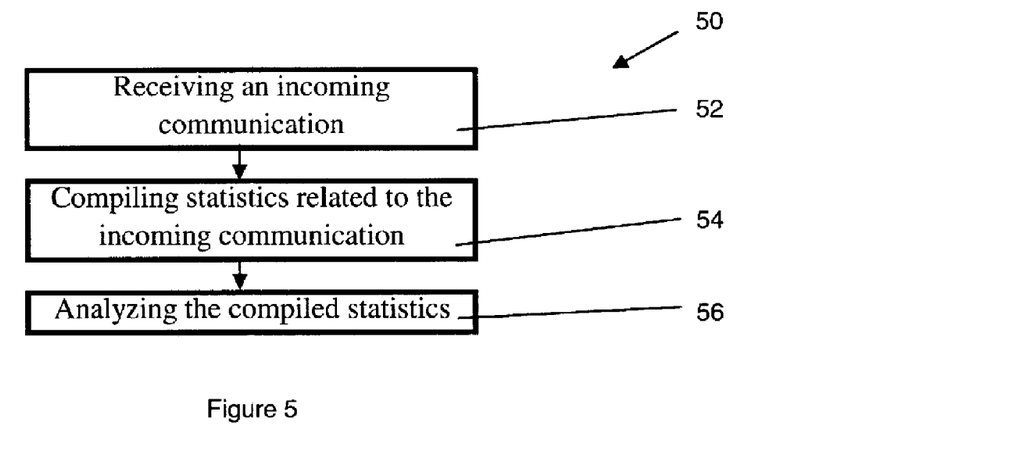
FIG. 5 depicts a first flow diagram of the method in accordance with a preferred embodiment of the present invention.

Referring now to FIG. 5, depicts a first method for compilation, analysis and graphical representation of call data 50 in accordance with the preferred embodiment of the invention. A method for compilation, analysis and graphical representation of call data that comprises, receiving 52 an incoming communication, compiling 54 statistics related to the incoming communication and analyzing 56 the compiled statistics. The method is performed by software, hardware, firmware, and/or the combination of software, hardware, and/or firmware.

Figure 6:
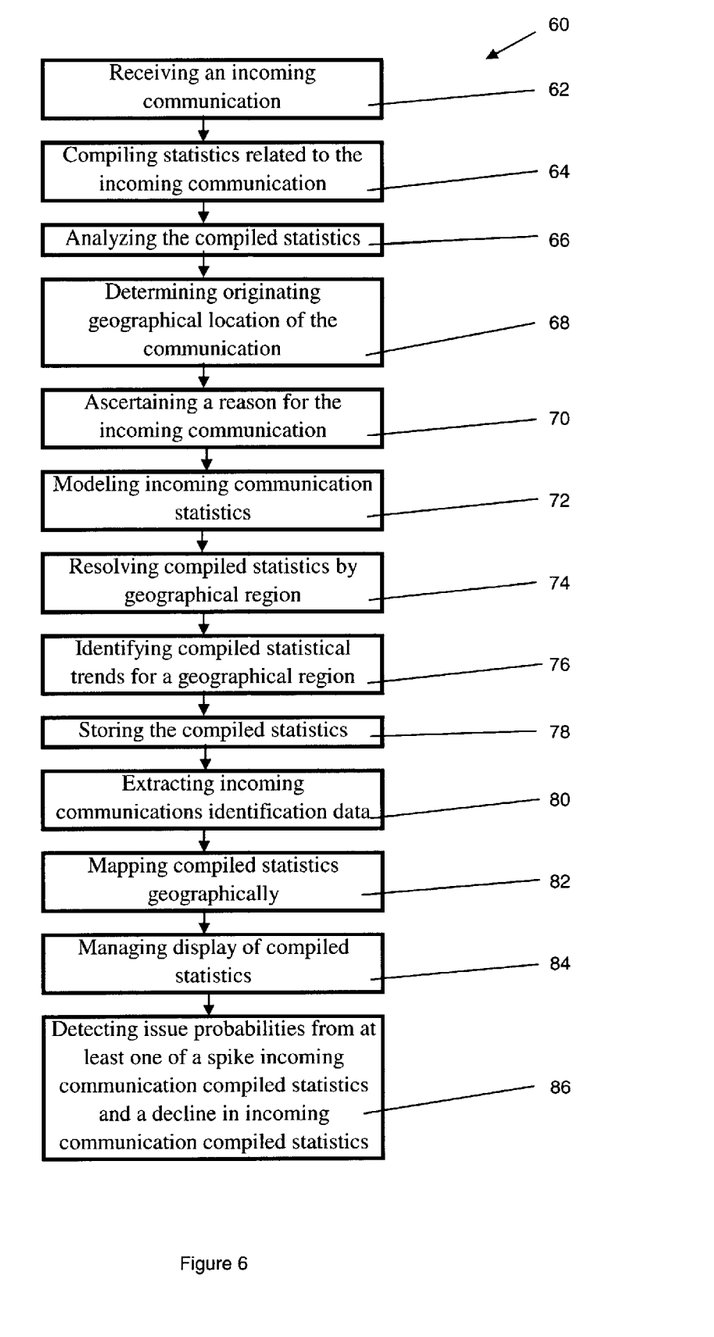
FIG. 6 depicts a second flow diagram of the method in accordance with a preferred embodiment of the present invention.

Referring now to FIG. 6, depicts a second method for compilation, analysis and graphical representation of call data 60 in accordance with the preferred embodiment of the invention. A method for compilation, analysis and graphical representation of call data that comprises, receiving 62 an incoming communication, compiling 64 statistics related to the incoming communication and analyzing 66 the compiled statistics. The method may also comprise determining 68 originating geographical location of the communication, ascertaining 70 a reason for the incoming communication, modeling 72 incoming communication statistics, resolving 74 compiled statistics by geographical region, identifying 76 compiled statistical trends for a geographical region, storing 78 compiled statistics, extracting 80 incoming communications identification data, mapping 82 compiled statistics geographically, managing 84 display of compiled statistics, detecting 86 issue probabilities from at least one of a spike incoming communication compiled statistics and a decline in incoming communication compiled statistics. The method is performed by software, hardware, firmware, and/or the combination of software, hardware, and/or firmware.

Figure 7:
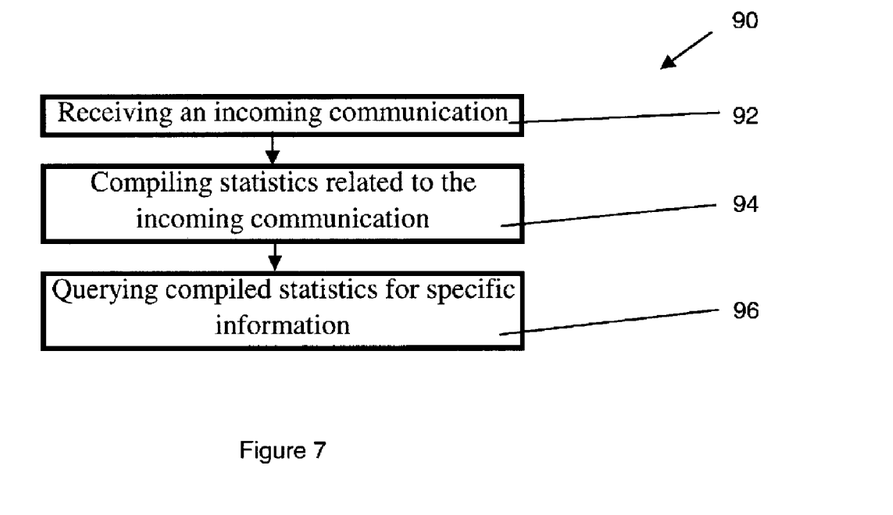
FIG. 7 depicts a first software block accordance with a preferred embodiment of the present invention.

Referring now to FIG. 7, depicts a first software block for compilation, analysis and graphical representation of call data 90 in accordance with the preferred embodiment of the invention. A computer readable medium comprising instructions for receiving 92 an incoming communication, compiling 94 statistics related to the incoming communication, and querying 96 compiled statistics for specific information. The transfer of information between the processor and the memory occurs via at least one of a wireless protocol, a wired protocol and the combination of a wireless protocol and a wired protocol. These steps are performed by software but in other embodiments, may be performed by hardware, firmware, and/or the combination of software, hardware, and/or firmware without departing from the scope of the present invention.

Figure 8:
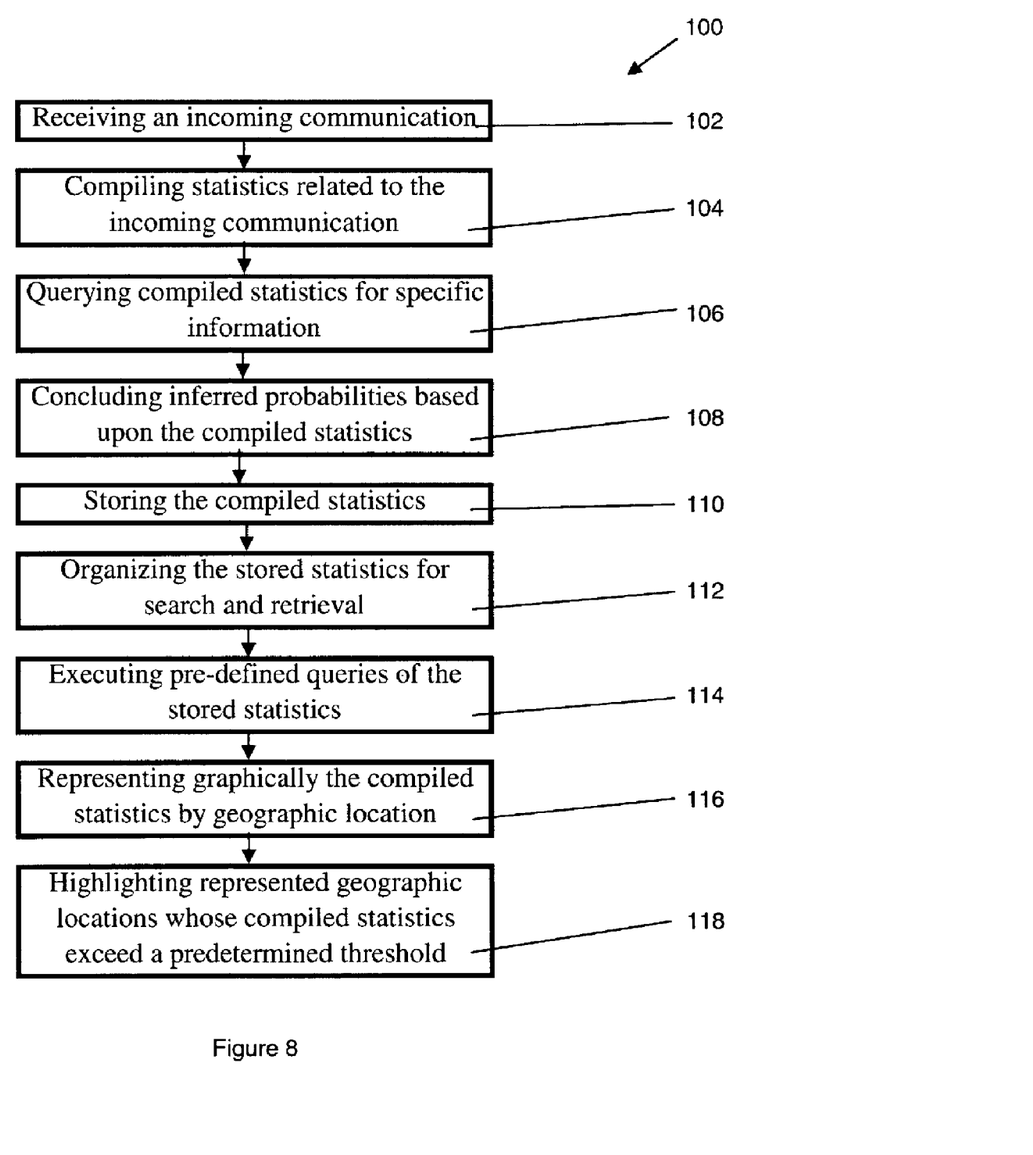
FIG. 8 depicts a second software block in accordance with a preferred embodiment of the present invention.

Referring now to FIG. 8, depicts a second software block for compilation, analysis and graphical representation of call data 100 in accordance with the preferred embodiment of the invention. A computer readable medium comprising instructions for receiving 102 an incoming communication, compiling 104 statistics related to the incoming communication, and querying 106 compiled statistics for specific information. The computer readable medium may comprise instructions for concluding 108 inferred probabilities based upon the compiled statistics, storing 110 the compiled statistics, organizing 112 the stored statistics for search and retrieval, executing 114 pre-defined queries of the stored statistics, representing 116 graphically the compiled statistics by geographic location and highlighting 118 represented geographic locations whose compiled statistics exceed a predetermined threshold. The transfer of information between the processor and the memory occurs via at least one of a wireless protocol, a wired protocol and the combination of a wireless protocol and a wired protocol. These steps are performed by software but in other embodiments, may be performed by hardware, firmware, and/or the combination of software, hardware, and/or firmware without departing from the scope of the present invention.

Figure 9:
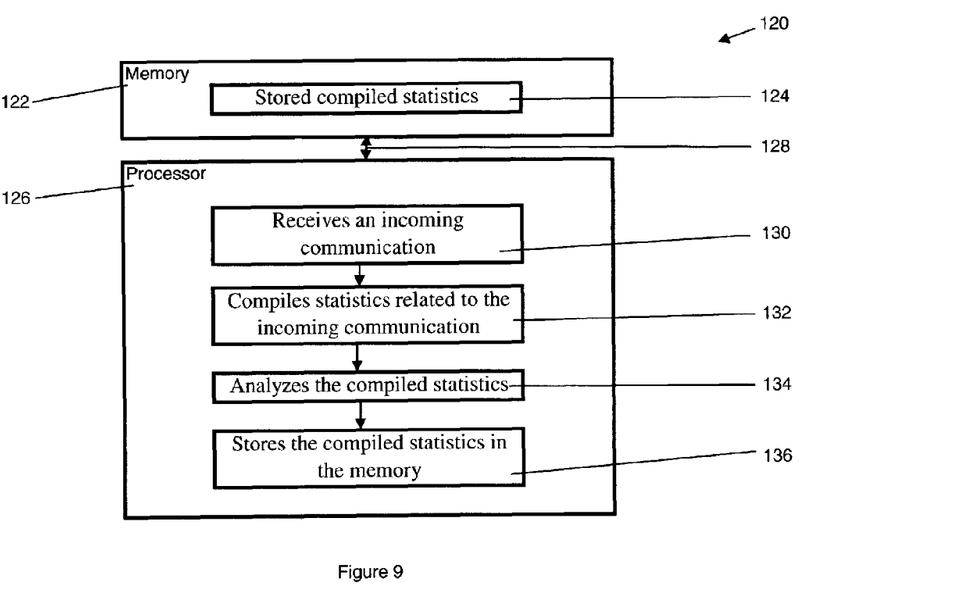
FIG. 9 depicts a first system in accordance with a preferred embodiment of the present invention.

Referring now to FIG. 9, depicts a first system for compilation, analysis and graphical representation of call data 120 in accordance with the preferred embodiment of the invention. A system for compilation, analysis and graphical representation of call data, that comprises, a memory 122 in which compiled statistics are stored 124, and a processor 126 communicably coupled 128 to the memory, wherein the processor receives 130 an incoming communication, compiles 132 statistics related to the incoming communication, analyzes 134 the compiled statistics, and stores 136 the compiled statistics in the memory. The transfer of information between the processor and the memory occurs via at least one of a wireless protocol, a wired protocol and a combination of a wireless protocol and a wired protocol. The steps performed in this figure are performed by software, hardware, firmware, and/or the combination of software, hardware, and/or firmware.

Figure 10:
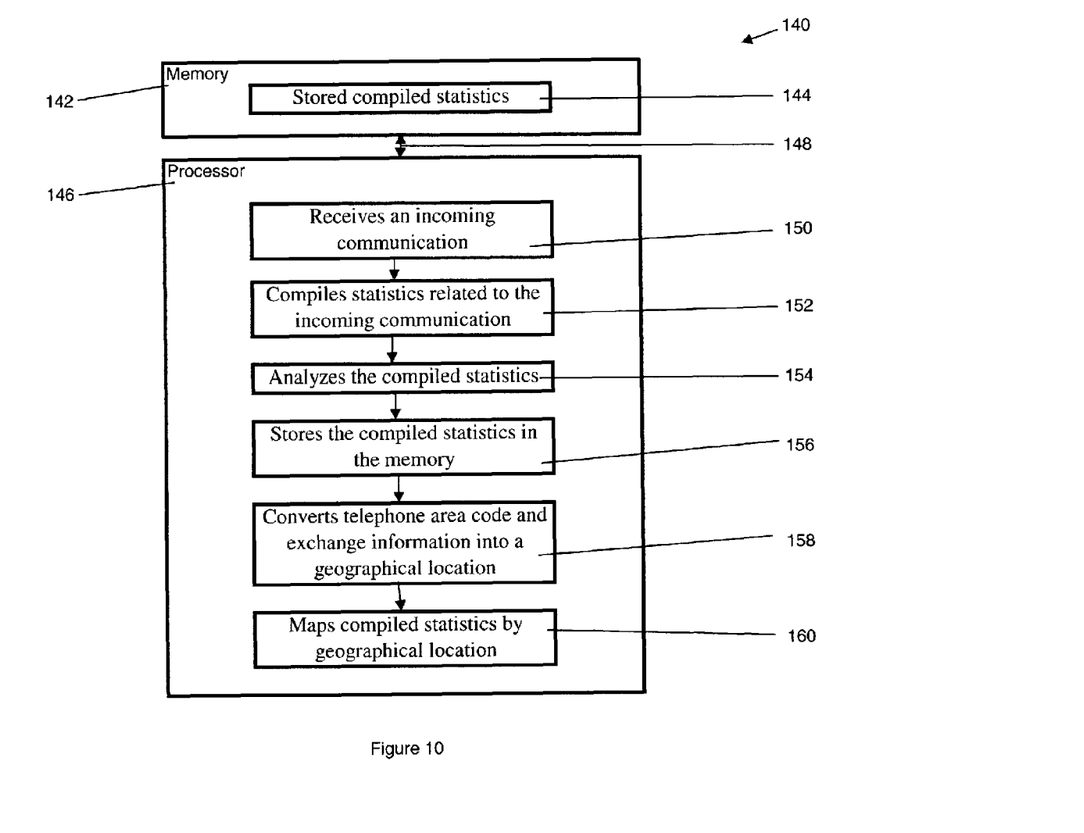
FIG. 10 depicts a second system in accordance with a preferred embodiment of the present invention.

Referring now to FIG. 10, depicts a second system for compilation, analysis and graphical representation of call data 140 in accordance with the preferred embodiment of the invention. A system for compilation, analysis and graphical representation of call data that comprises, a memory 142 in which compiled statistics are stored 144, and a processor 146 communicably coupled 148 to the memory, wherein the processor receives 150 an incoming communication, compiles 152 statistics related to the incoming communication, analyzes 154 the compiled statistics, and stores 156 the compiled statistics in the memory. The processor may also convert 158 telephone area code and exchange information into a geographical location, and map 160 compiled statistics by geographical location. The transfer of information between the processor and the memory occurs via at least one of a wireless protocol, a wired protocol and a combination of a wireless protocol and a wired protocol. The steps performed in this figure are performed by software, hardware, firmware, and/or the combination of software, hardware, and/or firmware.

Also, the GUI's of the present invention can be accessed, viewed, and manipulated via a wired source (such as a desktop computer) and/or via a wireless source (such as a wireless enabled computer or a cellular phone). Further, although depicted individually, the information on the maps can be depicted together along with the various other parameters described above. Still further, sounds, flashing icons, email alerts, and the like can be utilized with the present invention and a tiered level of indicators and information related to the indicators can be provided whereby such information can be overlaid to provide a visually appealing form of complementary data that may be voluminous.

Although the exemplary embodiment of the system of the present invention has been illustrated in the accompanied drawings and described in the foregoing detailed description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the processors. Further, although depicted in the particular manner, various blocks may be repositioned without departing from the scope of the current invention. For example, although depicted in the particular manner, the greater or lesser number of processors could be utilized.

What is claimed is:

1. A method for compilation, analysis and graphical representation of call data, comprising:
   receiving an incoming communication;
   ascertaining a reason for the incoming communication;
   compiling statistics related to the incoming communication, wherein the compiled statistics is represented graphically at least by geographic location when compiled statistics reaches a user-defined threshold;
   analyzing the compiled statistics, and
   detecting issue probabilities from at least one of a spike incoming communication compiled statistics and a decline in incoming communication compiled statistics.

2. The method of claim 1 comprising:
   determining originating geographical location of the communication.

3. The method of claim 1 comprising:
   modeling incoming communication statistics.

4. The method of claim 1 comprising:
   resolving compiled statistics by geographical region.

5. The method of claim 1 comprising:
   identifying compiled statistical trends for a geographical region.

6. The method of claim 1 comprising:
   storing compiled statistics.

7. The method of claim 1 comprising:
   extracting incoming communications identification data.

8. The method of claim 1 comprising:
   mapping compiled statistics geographically.

9. The method of claim 1 comprising:
   managing display of compiled statistics.

10. A computer readable medium comprising instructions for:
    receiving an incoming communication;
    compiling statistics related to the incoming communication, the statistics comprising a reason for an incoming communication, wherein the compiled statistics is represented graphically at least by geographic location when compiled statistics reaches a user-defined threshold;
    detecting issue probabilities from at least one of a spike incoming communication compiled statistics and a decline in incoming communication compiled statistics; and
    querying compiled statistics for specific information.

11. The computer readable medium of claim 10 comprising instructions for:
    storing the compiled statistics.

12. The computer readable medium of claim 11 comprising instructions for:
    organizing the stored statistics for search and retrieval.

13. The computer readable medium of claim 11 comprising instructions for:
    executing pre-defined queries of the stored statistics.

14. The computer readable medium of claim 10 comprising instructions for:
    representing graphically the compiled statistics by geographic location.

15. The computer readable medium of claim 14 comprising instructions for:
    highlighting represented geographic locations whose compiled statistics exceed a predetermined threshold.

16. A system for compilation, analysis and graphical representation of call data, comprising:
    a memory in which compiled statistics are stored; and
    a processor communicably coupled to the memory, wherein the processor:
      receives an incoming communication;
      compiles statistics related to the incoming communication, the statistics comprising a reason for an incoming communication, wherein the compiled statistics is represented graphically at least by geographic location when compiled statistics reaches a user-defined threshold;
      analyzes the compiled statistics;
      detects issue probabilities from at least one of a spike incoming communication compiled statistics and a decline in incoming communication compiled statistics; and
      stores the compiled statistics in the memory.

17. The system of claim 16 wherein the processor,
    converts telephone area code and exchange information into a geographical location; and
    maps compiled statistics by geographical location.

* * * * *